(12) United States Patent
Yamada

(10) Patent No.: US 12,106,691 B2
(45) Date of Patent: Oct. 1, 2024

(54) DISPLAY DEVICE

(71) Applicant: JOLED INC., Tokyo (JP)

(72) Inventor: Takahiro Yamada, Tokyo (JP)

(73) Assignee: JDI DESIGN AND DEVELOPMENT G.K., Tokyo (JP)

( * ) Notice: Subject to any disclaimer, the term of this patent is extended or adjusted under 35 U.S.C. 154(b) by 0 days.

(21) Appl. No.: 18/349,616

(22) Filed: Jul. 10, 2023

(65) Prior Publication Data

US 2024/0021115 A1 Jan. 18, 2024

(30) Foreign Application Priority Data

Jul. 13, 2022 (JP) ................................ 2022-112685

(51) Int. Cl.
    *G09G 3/00* (2006.01)
    *G01K 1/02* (2021.01)

(52) U.S. Cl.
    CPC ............ *G09G 3/006* (2013.01); *G01K 1/026* (2013.01); *G09G 2320/04* (2013.01); *G09G 2330/021* (2013.01)

(58) Field of Classification Search
None
See application file for complete search history.

(56) References Cited

U.S. PATENT DOCUMENTS

| | | | | |
|---|---|---|---|---|
| 10,629,118 B2 * | 4/2020 | Choi | .................... | G09G 3/3225 |
| 11,837,161 B2 * | 12/2023 | Hyeon | .................... | G09G 3/32 |
| 2012/0033151 A1 * | 2/2012 | Toyotaka | ............. | G09G 3/3426 349/43 |
| 2014/0104259 A1 * | 4/2014 | Oh | ........................ | G09G 3/3266 345/212 |
| 2017/0140719 A1 * | 5/2017 | Toyotaka | .......... | G02F 1/133553 |
| 2017/0236490 A1 * | 8/2017 | Cheon | ..................... | G09G 5/10 345/691 |
| 2020/0335874 A1 * | 10/2020 | Mizusaki | ............... | H01Q 13/22 |
| 2020/0372861 A1 * | 11/2020 | Ok | ........................ | G09G 3/3233 |
| 2021/0201758 A1 * | 7/2021 | Pyo | ......................... | G09G 5/10 |
| 2021/0398485 A1 * | 12/2021 | Park | ....................... | G01K 3/005 |
| 2022/0108650 A1 * | 4/2022 | Park | ......................... | G09G 3/32 |
| 2022/0130332 A1 * | 4/2022 | Ok | ........................ | G09G 3/3233 |
| 2023/0186826 A1 * | 6/2023 | Hong | ....................... | G01K 7/16 345/214 |
| 2023/0410714 A1 * | 12/2023 | Pyun | .................... | G09G 3/2007 |

* cited by examiner

*Primary Examiner* — Fred Tzeng

(74) *Attorney, Agent, or Firm* — Greenblum & Bernstein, P.L.C.

(57) ABSTRACT

A display device includes: a substrate temperature obtainer that obtains a substrate temperature of a substrate of a display panel; a power obtainer that obtains an amount of power used by a plurality of segmented regions of the display panel, based on image data displayed on the display panel; a first increased temperature deriver that derives an increased temperature of a panel surface of the display panel based on the amount of power used by the plurality of segmented regions; and a surface temperature estimator that estimates a temperature of the panel surface based on the substrate temperature and the increased temperature.

12 Claims, 11 Drawing Sheets

DISPLAY DEVICE

CROSS REFERENCE TO RELATED APPLICATIONS

The present application is based on and claims priority of Japanese Patent Application No. 2022-112685 filed on Jul. 13, 2022. The entire disclosure of the above-identified application, including the specification, drawings, and claims is incorporated herein by reference in its entirety.

FIELD

The present disclosure relates to a display device that displays images.

BACKGROUND

A display device including a display panel of a plurality of pixels is known. Each pixel includes one or more light-emitting elements, which tend to deteriorate with prolonged use. Patent Literature (PTL) 1 discloses a technique of controlling the driving of the pixels based on deterioration amounts calculated for each pixel based on information from a temperature sensor provided on a circuit substrate on the rear of the display panel.

CITATION LIST

Patent Literature

PTL 1: Japanese Unexamined Patent Application Publication No. 2021-110772

SUMMARY

Technical Problem

However, the light-emitting elements are located on the front of the display panel, so the information from the temperature sensor provided on the circuit substrate on the rear of the display panel does not provide accurate temperatures for the front of the display panel. It is therefore not possible to accurately know the pixel deterioration amount, and thus proper control of the driving of the pixels may not be possible.

In view of this, the present disclosure provides a display device that can estimate the temperature of the surface of the display panel.

Solution to Problem

In order to achieve the above object, in one aspect, a display device according to the present disclosure includes: a substrate temperature obtainer that obtains a substrate temperature of a substrate of a display panel; a power obtainer that obtains an amount of power used by a plurality of segmented regions of the display panel, based on image data displayed on the display panel; an increased temperature deriver that derives an increased temperature of a panel surface of the display panel based on the amount of power used by the plurality of segmented regions; and a surface temperature estimator that estimates a temperature of the panel surface based on the substrate temperature and the increased temperature.

Advantageous Effects

The display device according to the present disclosure can estimate the temperature of the surface of the display panel.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENT(S)

Outline of Present Disclosure

With the display device according to the above-described conventional techniques, the driving of the pixels is controlled based on deterioration amounts calculated for each pixel based on information from a temperature sensor provided on a substrate on the rear of the display panel. However, the light-emitting elements, which generate heat when emitting light, are provided on the front of the display panel, so the temperature sensor provided on the substrate on the rear of the display panel does not provide accurate temperatures for the front of the display panel. Accordingly, pixel deterioration amount cannot be accurately known, and proper control of the driving of the pixels may not be possible.

In contrast, the display device according to the present disclosure is configured to estimate the temperature of the surface of the display panel by adding the increased temperature of the surface of the display panel to the substrate temperature obtained by the temperature sensor. Specifically, with the display device according to the present disclosure, the amount of power used by a plurality of segmented regions of the display panel is obtained based on image data displayed by the display panel, the increased temperature of the surface of the display panel is derived based on the obtained amount of power, and the temperature of the surface of display panel is estimated by adding the increased temperature to the substrate temperature. This configuration makes it possible to appropriately estimate the temperature of the surface of the display panel.

The following describes an exemplary embodiment of the present disclosure. The embodiment described below is merely one specific example of the present disclosure. The numerical values, shapes, materials, elements, and arrangement and connection of the elements, steps, order of the steps, etc., indicated in the following embodiment are given merely by way of illustration and are not intended to limit the present disclosure. Therefore, among elements in the following embodiments, those not recited in any of the independent claims defining the broadest concept of the present disclosure are described as optional elements.

Note that the figures are schematic illustrations and are not necessarily precise depictions. In the figures, elements that are essentially the same share like reference signs. Accordingly, duplicate description is omitted or simplified.

Embodiment

Basic Configuration of Display Device

The basic configuration of display device 1 according to an embodiment of the present disclosure will be described with reference to FIG. 1 and FIG. 2.

Figure 1:
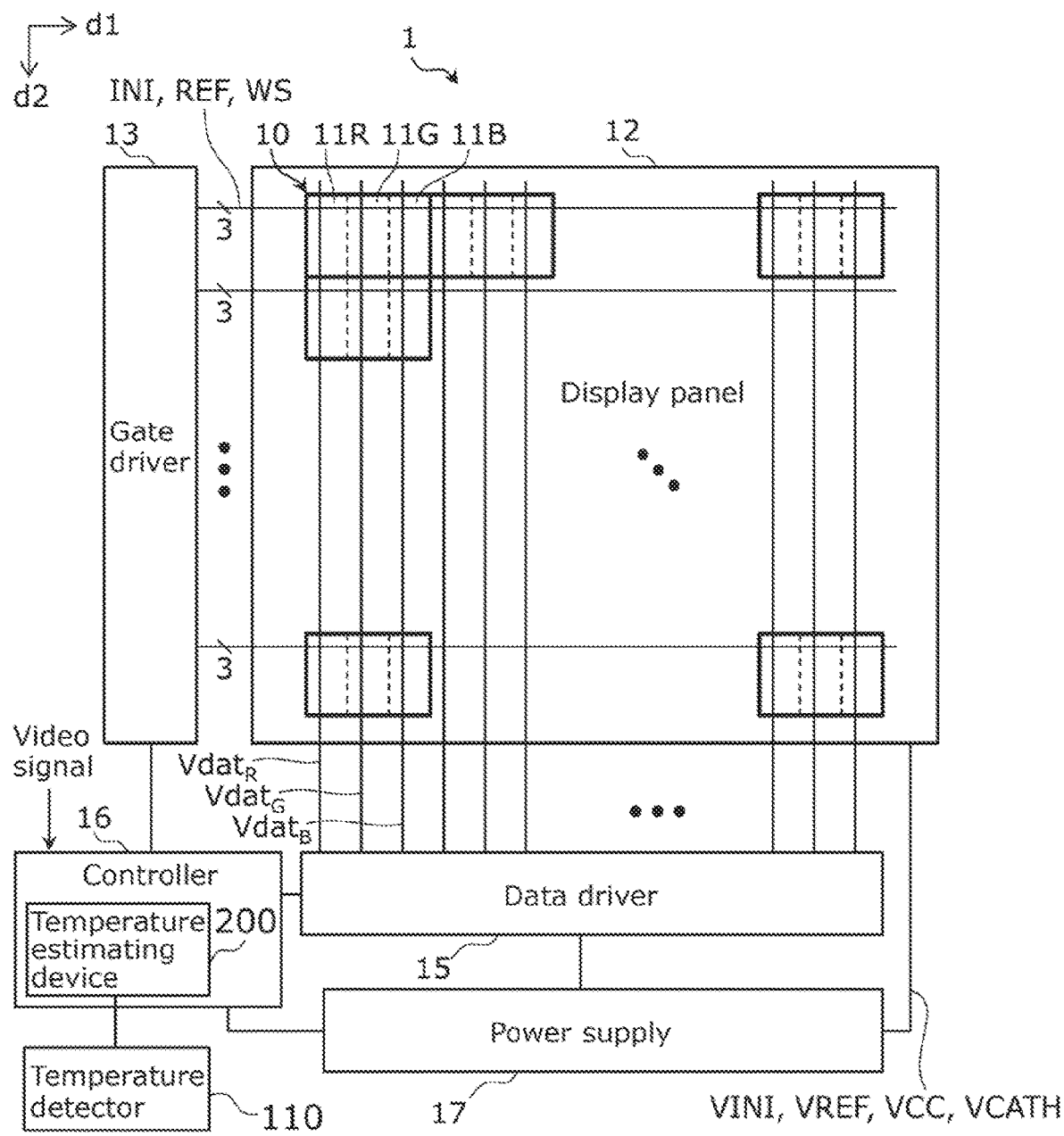
FIG. 1 illustrates the basic configuration of a display device according to an embodiment of the present disclosure.

FIG. 1 illustrates the basic configuration of display device 1 according to the embodiment. In the following description, for succinctness, the same reference sign will be used to identify a signal and the wiring for transmitting the signal, and the same reference sign will be used to identify a voltage and the wiring for supplying the voltage. Similarly, the same reference sign will be used to identify a circuit and the region where the circuit is formed.

As illustrated in FIG. 1, display device 1 includes display panel 12, gate driver 13, data driver 15, and power supply 17. Controller 16 includes therein temperature estimating device 200 that estimates the temperature of the surface of display panel 12. Display device 1 also includes temperature detector 110 that detects the temperature of the substrate. Temperature detector 110 and temperature estimating device 200 will be described later.

Display panel 12 includes a plurality of pixel circuits 10 arranged in a matrix. The plurality of pixel circuits 10 are arranged in first direction d1 and second direction d2 intersecting first direction d1. First direction d1 and second direction d2 are orthogonal to each other.

Each pixel circuit 10 includes three sub-pixel circuits 11R, 11G, and 11B respectively corresponding to the R, G, and B emission colors.

Display panel 12 includes initializing signal line INI, reference signal line REF, and write signal line WS connected to pixel circuits 10. Initializing signal line INI, reference signal line REF, and write signal line WS respectively transmit to pixel circuits 10 initializing signals INI, reference signals REF, and write signals WS supplied from gate driver 13.

Display panel 12 also includes data signal lines $Vdat_R$, $Vdat_G$, and $Vdat_B$ connected to pixel circuits 10. Data signal lines $Vdat_R$, $Vdat_G$, and $Vdat_B$ respectively transmit to pixel circuits 10 data signals $Vdat_R$, $Vdat_G$, and $Vdat_B$ supplied from data driver 15, which are related to the R, G, and B luminances.

Controller 16 receives an external video signal, and supplies gate driver 13 and data driver 15 with control signals for displaying images corresponding to the frames of the video signal on display panel 12.

Power supply 17 supplies voltage to display panel 12, gate driver 13, data driver 15, and controller 16. Display panel 12 is supplied with initializing voltage VINI, reference voltage VREF, positive power supply voltage VCC, and negative power supply voltage VCATH from power supply 17.

Figure 2:
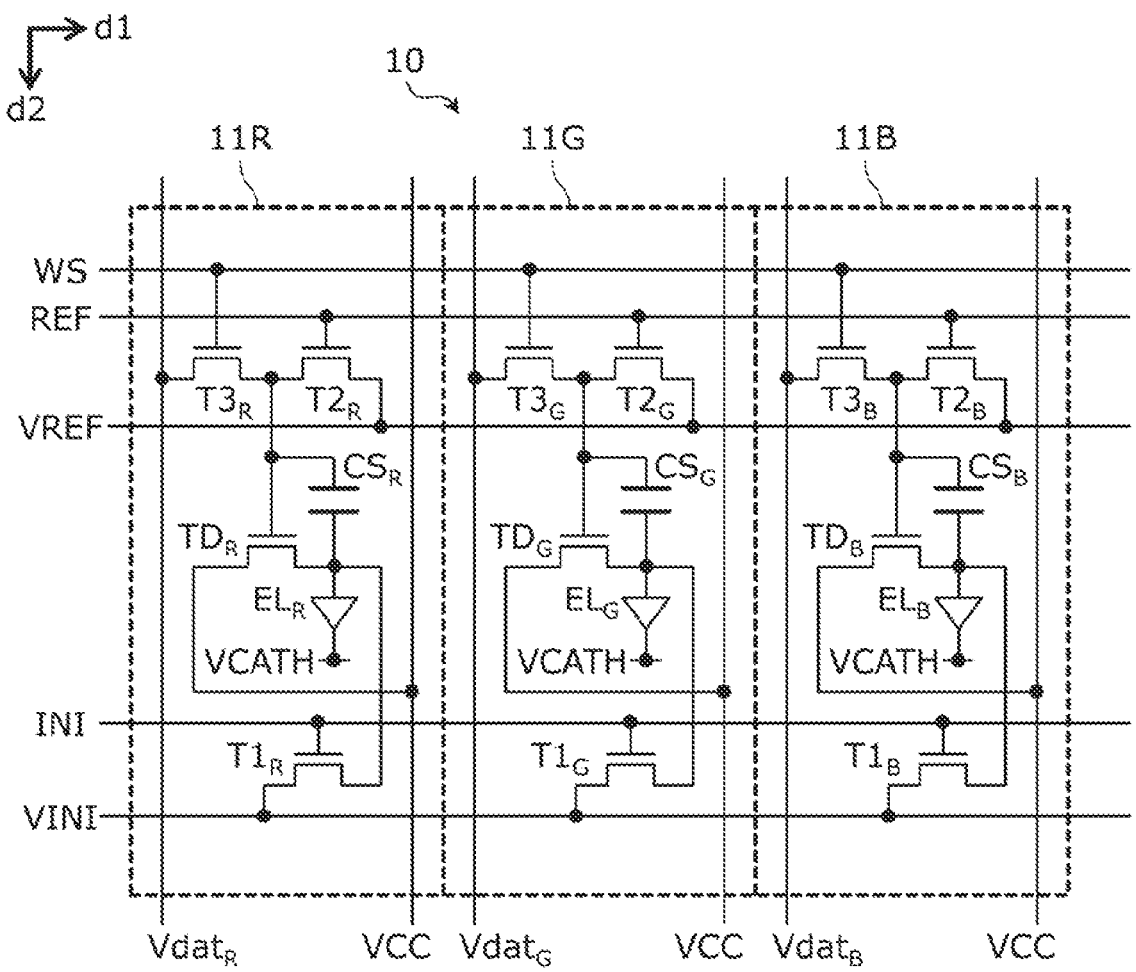
FIG. 2 is a circuit diagram of a pixel circuit included in the display device according to the embodiment.

FIG. 2 is a circuit diagram of pixel circuit 10 included in display device 1.

As illustrated in FIG. 2, each sub-pixel circuit 11R, 11G, and 11B includes organic electroluminescent (EL) light-emitting elements $EL_R$, $EL_G$, and $EL_B$, and a plurality of transistors for driving light-emitting elements $EL_R$, $EL_G$, and $EL_B$ to emit light. Pixel circuit is supplied with positive power supply voltage VCC, which is voltage for causing light-emitting elements $EL_R$, $EL_G$, and $EL_B$ to emit light. Pixel circuit 10 is also supplied, via a cathode layer or the like, with negative power supply voltage VCATH, which is voltage for causing light-emitting elements $EL_R$, $EL_G$, and $EL_B$ to emit light.

Each of sub-pixel circuits 11R, 11G, and 11B of pixel circuit 10 has the same configuration. Hereinafter, the configuration of pixel circuit 10 will be described focusing on sub-pixel circuit 11R.

Sub-pixel circuit 11R includes initializing transistor $T1_R$, voltage compensating transistor $T2_R$, write transistor $T3_R$, drive transistor $TD_R$, storage capacitor $CS_R$, and light-emitting element $EL_R$.

Initializing transistor $T1_R$ is placed in an on-state by initializing signal INI, and sets the source node of drive transistor $TD_R$ to initializing voltage VINI. Voltage compensating transistor $T2_R$ is placed in an on-state by reference signal REF, and sets the gate node of drive transistor $TD_R$ to reference voltage VREF. Write transistor $T3_R$ is placed in an on-state by write signal WS, and stores the voltage of data signal $Vdat_R$ in storage capacitor $CS_R$. Drive transistor $TD_R$ supplies current to light-emitting element $EL_R$ in accordance with the voltage stored in storage capacitor $CS_R$. With this, light-emitting element $EL_R$ emits light at a luminance in accordance with the voltage of data signal $Vdat_R$.

Sub-pixel circuits 11G and 11B have the same configuration as sub-pixel circuit 11R. Accordingly, in sub-pixel circuits 11G and 11B as well, data signals $Vdat_G$ and $Vdat_B$ are stored at the same time by initializing signal INI, reference signal REF, and write signal WS, and light-emitting elements $EL_G$ and $EL_B$ emit light at luminances in accordance with the voltages of the stored data signals.

Display device 1 according to the present embodiment includes temperature estimating device 200 that estimates the temperature of the surface of display panel 12 in order to accurately know the deterioration amount of each pixel including light-emitting elements and control the driving of each pixel based on the deterioration amount thereof accordingly.

Temperature Estimating Device Configuration

The configuration of temperature estimating device 200 will be described with reference to FIG. 3 through FIG. 7.

Figure 3:
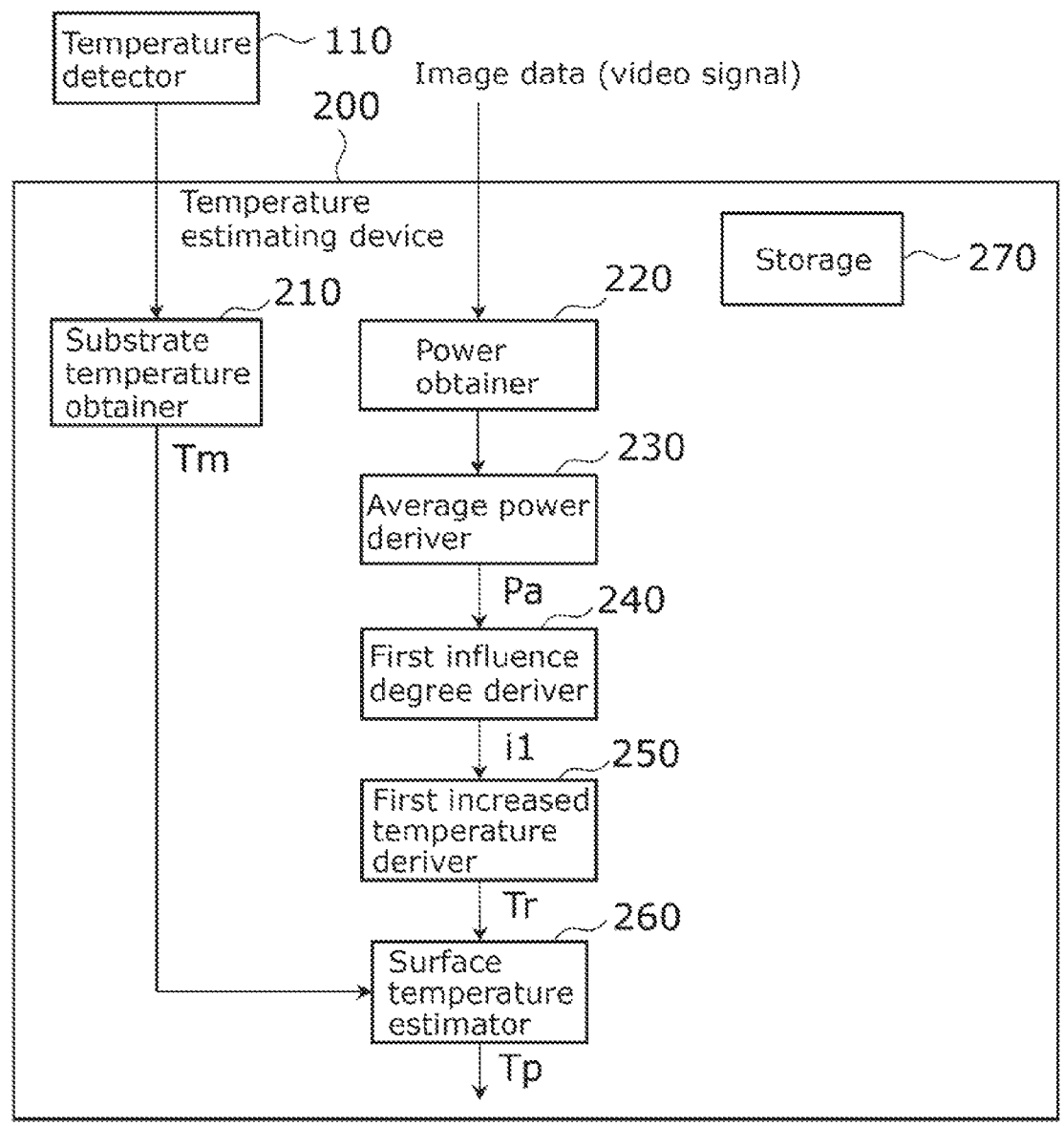
FIG. 3 is a block diagram of a temperature estimating device included in the display device according to the embodiment.

FIG. 3 is a block diagram of temperature estimating device 200 included in display device 1. Note that FIG. 3 also illustrates temperature detector 110 for detecting the temperature of the substrate.

As illustrated in FIG. 3, temperature estimating device 200 includes substrate temperature obtainer 210, power obtainer 220, average power deriver 230, first influence degree deriver 240, first increased temperature deriver 250, and surface temperature estimator 260. Temperature estimating device 200 also includes storage 270 that stores various information. The functions of each element included in temperature estimating device 200 are realized by hardware included in temperature estimating device 200. However, the functions of each element included in temperature estimating device 200 may be realized by executing a software program stored in storage 270.

Figure 4:
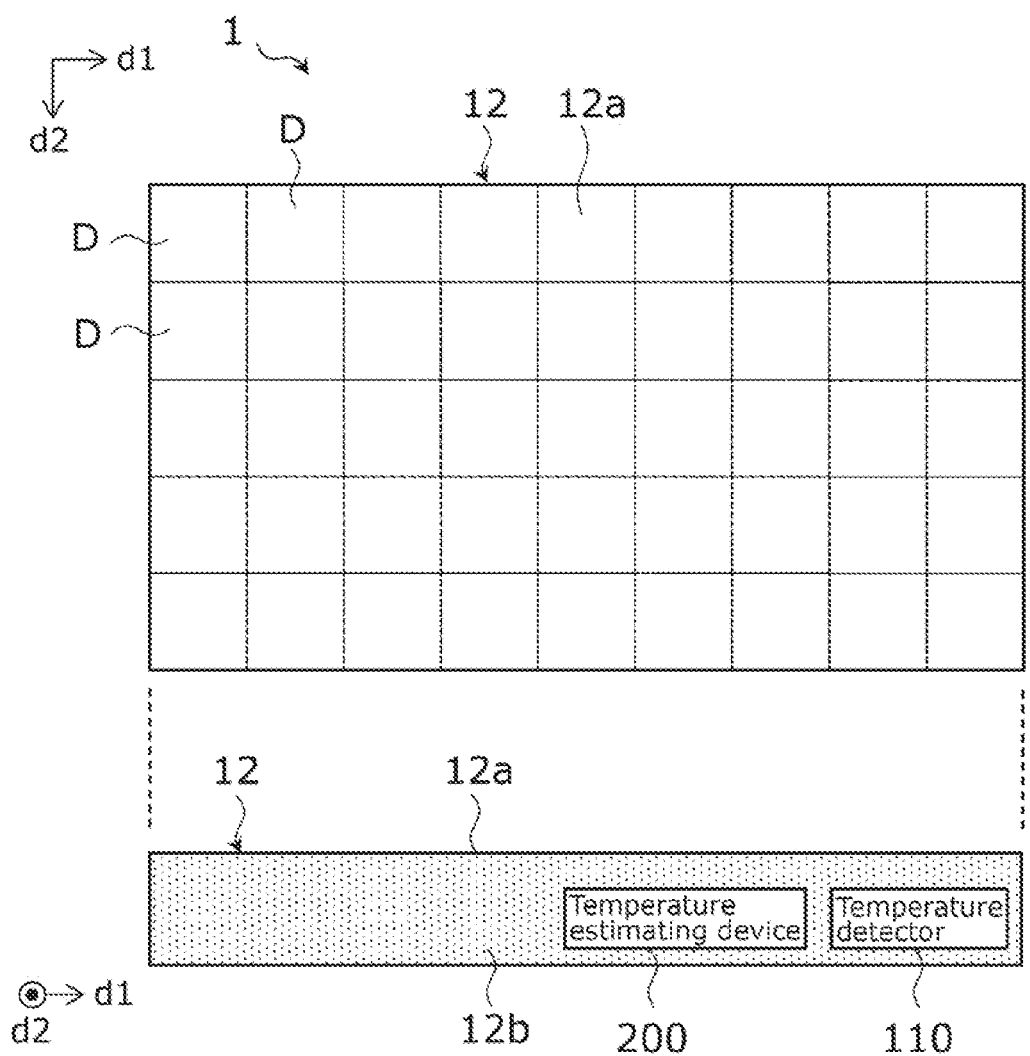
FIG. 4 illustrates one example of a display panel included in the display device according to the embodiment and segmented regions of the display panel.

FIG. 4 illustrates one example of display panel 12 included in display device 1 and segmented regions D of display panel 12.

Display panel 12 includes substrate 12b. The base material of substrate 12b is, for example, glass or resin. Pixel circuits 10 described above are provided in display panel 12. Display panel 12 shows images on panel surface 12a, which is the surface of display panel 12.

Temperature detector 110 illustrated in FIG. 4 is a sensor that detects the temperature of substrate 12b, and is provided inside substrate 12b. However, temperature detector 110 may be provided on the rear surface of substrate 12b. For example, temperature detector 110 includes a single temperature sensor, but temperature detector 110 is not limited to this example and may include a plurality of temperature sensors. The detection of the temperature of substrate 12b by temperature detector 110 is performed as required. Temperature information detected by temperature detector 110 is output to substrate temperature obtainer 210 of temperature estimating device 200.

Substrate temperature obtainer 210 illustrated in FIG. 3 obtains the temperature information output from temperature detector 110. When temperature detector 110 includes a plurality of temperature sensors, substrate temperature obtainer 210 may take the average of the temperatures obtained by the plurality of temperature sensors as the temperature of substrate 12b. Information related to the temperature of substrate 12b obtained by substrate temperature obtainer 210, i.e., information related to substrate temperature Tm, is output to surface temperature estimator 260 that estimates the temperature of the surface of display panel 12.

In the present embodiment, the temperature of the surface of display panel 12 is estimated based on increased temperature Tr of panel surface 12a and substrate temperature Tm. Increased temperature Tr of panel surface 12a is derived based on the brightness of an image displayed on display panel 12. The brightness of the image is affected by the power supplied to pixel circuit 10. For example, when the power is high and the image is bright, the temperature of the surface of display panel 12 is high, and when the power is low and the image is dark, the temperature of the surface of display panel 12 is low. Therefore, in the present embodiment, information related to power required to display an image is obtained, and the temperature of display panel 12 is estimated based on this information related to power.

Power obtainer 220 obtains information related to power required to display an image. For example, power obtainer 220 obtains the amount of power used by segmented regions D of display panel 12 based on the image data displayed on display panel 12.

FIG. 4 illustrates one example of segmented regions D of display panel 12. Segmented regions D are regions in to which display panel 12 has been virtually segmented. The number of segmented regions D is, for example, between 60 and 100, inclusive, and is selected according to, for example, the computing power of temperature estimating device 200.

When display panel 12 is viewed perpendicular to panel surface 12a, segmented regions D have a square shape. However, segmented regions D may have a rectangular shape. The aspect ratio of segmented region D may be the same as the aspect ratio of the display region of display panel 12. Each segmented region D preferably has the same surface area and pixel count. When the surface area of segmented regions D varies, the power of each segmented region D is obtained by converting it into power per unit area, for example.

Power obtainer 220 illustrated in FIG. 3 obtains the amount of power used by each of segmented regions D based on the image data displayed on display panel 12. The power used by a given segmented region D is determined by the current and voltage supplied to the corresponding pixel circuits 10 based on the video signal, which is image data. If the amount of power is obtained per pixel circuit 10, a huge amount of computing is required in subsequent stages, which is why power obtainer 220 segments display panel 12 into a plurality of blocks and obtains the amount of power per segmented region D. Information related to power obtained by power obtainer 220 is output to average power deriver 230.

Average power deriver 230 derives average power Pa, which is the average power of all segmented regions D, based on the information related to power output from power obtainer 220. For example, if heat can diffuse easily and thus the temperature of the entire panel surface 12a tends to be uniform, increased temperature Tr of panel surface 12a is dependent on average power Pa of all of segmented regions D. Therefore, average power deriver 230 according to the present embodiment derives average power Pa of all segmented regions D based on the power used in each segmented region D. Note that heat being able to diffuse easily means being able to easily transfer between adjacent segmented regions D owing to a lack of walls partitioning display panel 12 or a hood covering display panel 12, for example. Information related to average power Pa derived by average power deriver 230 is output to first influence degree deriver 240.

Based on average power Pa output from average power deriver 230, first influence degree deriver 240 derives a degree of influence that average power Pa has on a temperature increase of panel surface 12a. Hereinafter, the degree of influence that average power Pa has on a temperature increase of panel surface 12a will be referred to as first influence degree i1. The function indicating the relationship between average power Pa and first influence degree i1 will hereinafter be referred to as first power-influence function f1.

Figure 5:
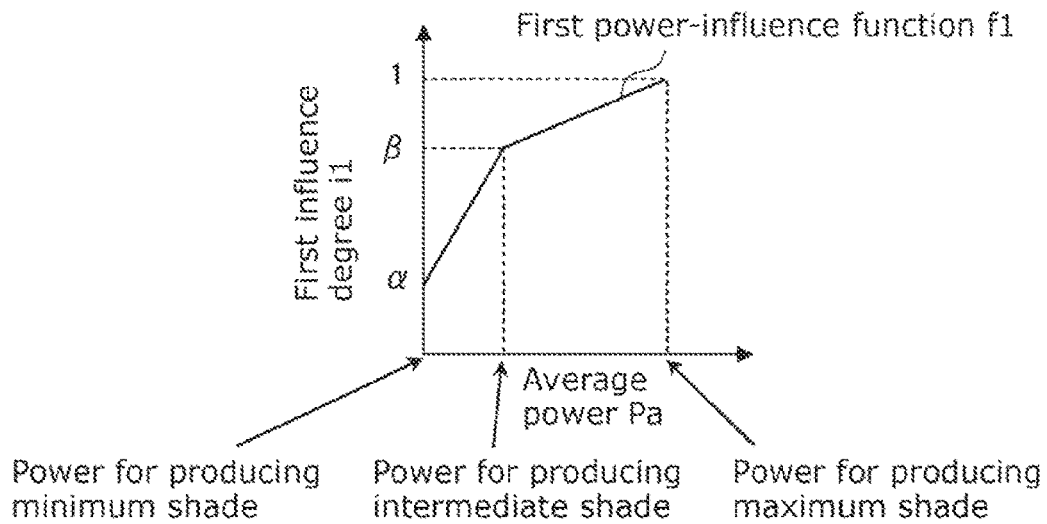
FIG. 5 schematically illustrates a first power-influence function.

FIG. 5 schematically illustrates first power-influence function f1.

For example, first power-influence function f1 illustrated in FIG. 5 can be calculated as follows. First, predetermined image data is shown on a predetermined segmented region D while a thermocouple is contacting the predetermined segmented region D, and the temperature of the predetermined segmented region D is measured. The predetermined image data is data corresponding to a plurality of different shades, and includes, for example three shades—a minimum shade, an intermediate shade, and a maximum shade. For the minimum shade, power is supplied to provide a minimum pixel emission rate, and for the maximum shade, power is supplied to provide a maximum pixel emission rate. For the intermediate shade, power is supplied to provide a pixel emission rate between the maximum and minimum pixel emission rates. The number of different shades is not limited to three; four or more different shades may be used.

Since the environment in which the temperature of display panel 12 is measured with a thermocouple differs from the environment in which display device 1 is actually used, this example normalizes the relationship between the power corresponding to the plurality of different shades and the degree of influence that average power Pa has on a temperature increase of panel surface 12a. For example, assume the degree of influence of power for producing the minimum shade is a and the degree of influence of power for producing the maximum shade is 1. The degree of influence of power for producing the intermediate shade is set to β which is greater than a and less than 1 ($\alpha<\beta<1$) so as to correspond to the temperature measured by the thermocouple. This yields first power-influence function f1 in which the relationship between average power Pa and first influence degree i1 is normalized. First power-influence function f1 may be a function obtained by multivariate analysis. First power-influence function f1 obtained in this way is stored in storage 270.

First influence degree deriver 240 illustrated in FIG. 3 derives first influence degree i1 by substituting average power Pa derived by average power deriver 230 into first power-influence function f1. First influence degree deriver 240 may derive first influence degree i1 by data interpolation when there is no influence degree value that directly corresponds to average power Pa. The information related to first influence degree i1 obtained by first influence degree deriver 240 is output to first increased temperature deriver 250.

First increased temperature deriver 250 derives the average increased temperature Tr of panel surface 12a based on the information related to first influence degree i1 output from first influence degree deriver 240.

Figure 6:
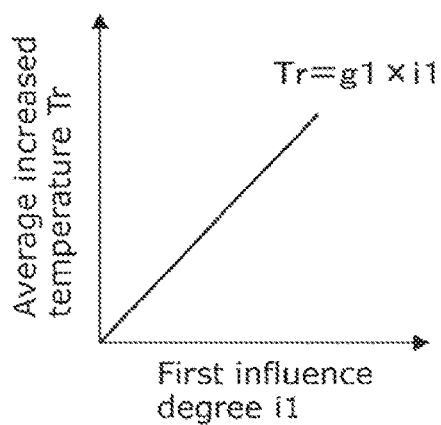
FIG. 6 schematically illustrates the relationship between a first influence degree and the increased temperature of the panel surface.

FIG. 6 schematically illustrates the relationship between first influence degree i1 and increased temperature Tr.

First increased temperature deriver 250 multiplies first influence degree i1 by a predetermined first coefficient g1 to derive the average increased temperature Tr of panel surface 12a. For example, the average increased temperature Tr is calculated using the equation "average increased temperature Tr=first coefficient g1×first influence degree i1 . . . (Expression 1)".

Coefficient g1 is a value for applying normalized data to actual data. Coefficient g1 may be a value that changes depending on the season or region in which display device 1 is used. Coefficient g1 is set such that the increased temperature is the maximum temperature when first influence degree i1 is 1. For example, when the maximum increased temperature corresponding to power for producing the maximum shade is 20° C., coefficient g1 is set to 20 so that first influence degree i1 equals 1. Coefficient g1 determined in this manner is stored in storage 270.

First increased temperature deriver 250 derives the average increased temperature Tr of panel surface 12a using the predetermined coefficient g1. Information related to the average increased temperature Tr of panel surface 12a is output to surface temperature estimator 260.

Surface temperature estimator 260 illustrated in FIG. 3 estimates the temperature of panel surface 12a based on substrate temperature Tm obtained by substrate temperature obtainer 210 and the average increased temperature Tr of panel surface 12a.

Figure 7:
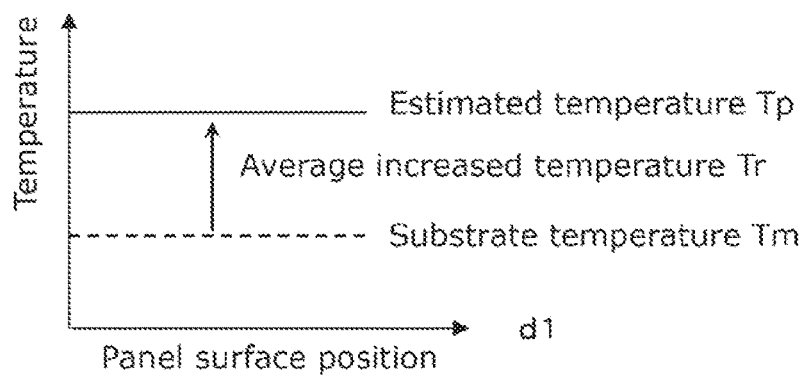
FIG. 7 illustrates the substrate temperature, the increased temperature of the panel surface, and the estimated temperature of the panel surface.

FIG. 7 illustrates substrate temperature Tm, increased temperature Tr of panel surface 12a, and estimated temperature Tp of panel surface 12a.

As illustrated in FIG. 7, surface temperature estimator 260 derives estimated temperature Tp, which is the temperature of panel surface 12a, by adding the average increased temperature Tr of panel surface 12a to substrate temperature Tm. Estimated temperature Tp derived by temperature estimating device 200 is processed in controller 16 (see FIG. 1). Controller 16 knows the deterioration amount of display panel 12 based on estimated temperature Tp, and controls the driving of display panel 12 based on the deterioration amount.

Display device 1 according to the embodiment includes: substrate temperature obtainer 210 that obtains substrate temperature Tm of substrate 12b of display panel 12; power obtainer 220 that obtains an amount of power used by a plurality of segmented regions D of display panel 12, based on image data displayed on display panel 12; first increased temperature deriver 250 that derives increased temperature Tr of panel surface 12a of display panel 12 based on the amount of power used by the plurality of segmented regions D; and surface temperature estimator 260 that estimates a temperature of panel surface 12a based on substrate temperature Tm and increased temperature Tr.

According to this display device 1, increased temperature Tr of panel surface 12a is derived based on power used by the plurality of segmented regions D of display panel 12. This makes it possible to appropriately estimate the temperature of panel surface 12a based on substrate temperature Tm and increased temperature Tr.

Variation 1 of Embodiment

Next, display device 1 according to Variation 1 of the embodiment will be described with reference to FIG. 8 and FIG. 9. In the present variation, an example will be given in which average power Pa is gradually changed and output rather than switching average power Pa immediately in accordance with changes in the image data.

Display device 1 according to Variation 1 includes display panel 12, gate driver 13, data driver 15, controller 16, and power supply 17. Controller 16 includes therein temperature estimating device 200A that estimates the temperature of the surface of display panel 12. Display device 1 according to Variation 1 also includes temperature detector 110.

Figure 8:
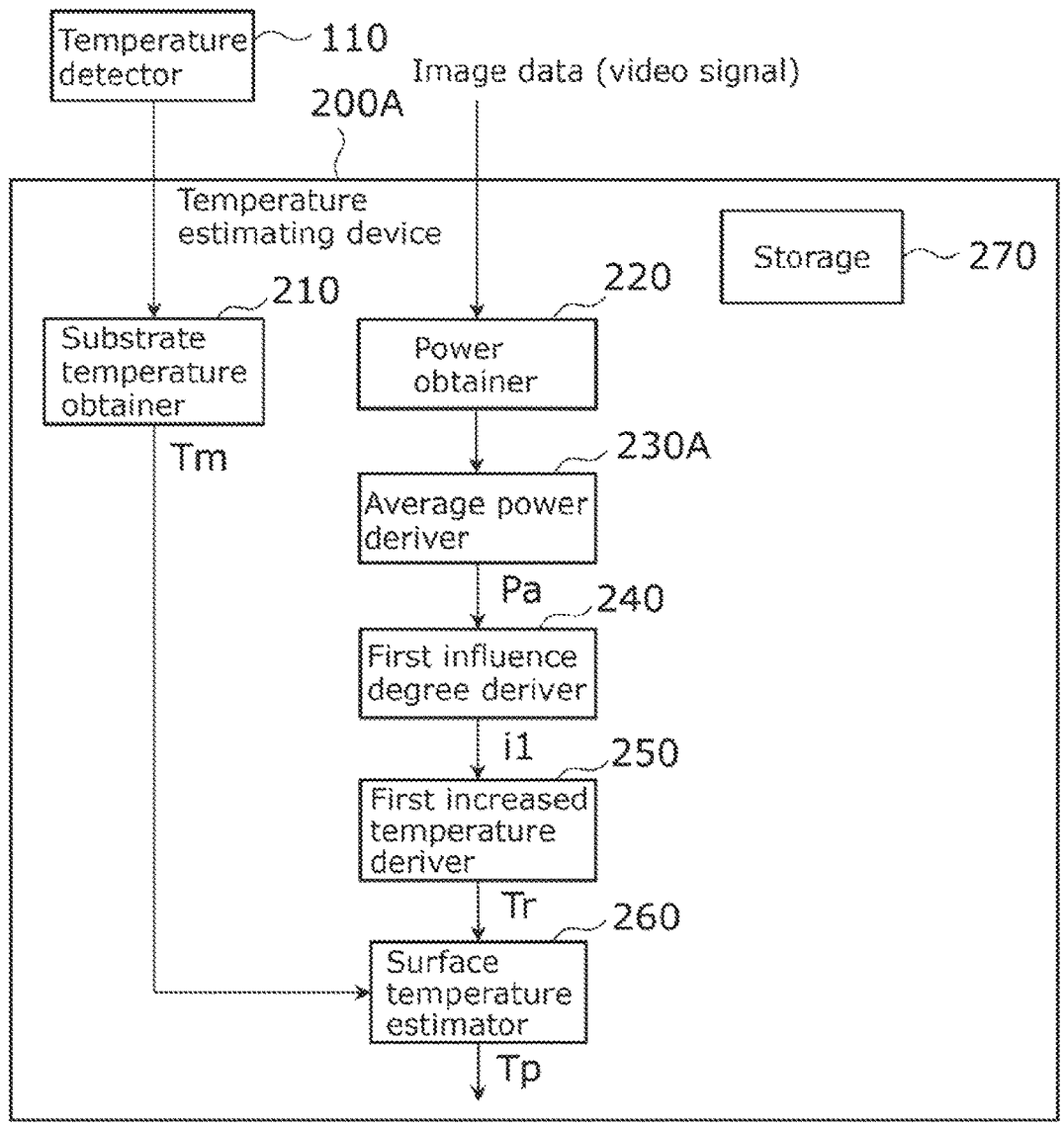
FIG. 8 is a block diagram of a temperature estimating device included in the display device according to Variation 1 of the embodiment.

FIG. 8 is a block diagram of temperature estimating device 200A included in display device 1.

As illustrated in FIG. 8, temperature estimating device 200A includes substrate temperature obtainer 210, power obtainer 220, average power deriver 230A, first influence degree deriver 240, first increased temperature deriver 250, and surface temperature estimator 260. Temperature estimating device 200A also includes storage 270 that stores various information.

Average power deriver 230A derives average power Pa of all segmented regions D based on the information related to power output from power obtainer 220.

For example, when the images shown on display panel 12 correspond to a transition from a dark scene to a bright scene, the amount of power required to show the images is immediately switched, but more often than not the temperature of display panel 12 does not immediately change. In view of this, with average power deriver 230A according to the present variation, average power Pa is gradually changed and output rather than switching average power Pa immediately in accordance with changes in the image data.

Figure 9:
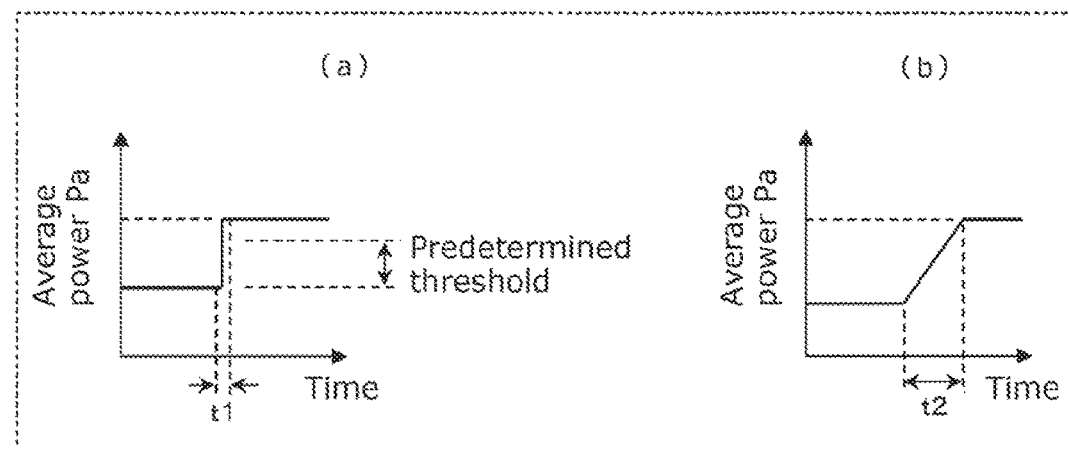
FIG. 9 illustrates the average power output from an average power deriver of the temperature estimating device according to Variation 1.

FIG. 9 illustrates the average power output from average power deriver 230A of the temperature estimating device.

In FIG. 9, (a) illustrates average power Pa output from average power deriver 230 according to the embodiment, and (b) illustrates average power Pa output from average power deriver 230A according to Variation 1.

For example, when the images shown on display panel 12 correspond to a transition from a dark scene to a bright scene, average power Pa abruptly increases as illustrated in (a) in FIG. 9. Since the temperature of display panel 12 does not rise abruptly, when the temperature of panel surface 12a is estimated based on average power Pa output from average power deriver 230, the estimated temperature differs from the actual temperature of panel surface 12a. In view of this, in Variation 1, the temperature of panel surface 12a is estimated taking into account the delay in the temperature increase of display panel 12.

As illustrated in (b) in FIG. 9, when a change in average power Pa during predetermined period t1 is greater than a predetermined threshold, average power Pa is derived so as to change over period t2 longer than the predetermined period. Specifically, average power deriver 230A derives a time-varying average power Pa, such that average power Pa changes proportionally over period t2. For example, predetermined period t1 can be selected as appropriate from a range of 0.03 seconds to 0.3 seconds, inclusive. Period t2 can be selected as appropriate from a range of 10 to 100 times that of predetermined period t1, inclusive. For example, when the images correspond to a transition from a dark scene to a bright scene, average power deriver 230A gradually increases average power Pa, and when the images correspond to a transition from a bright scene to a dark scene, average power deriver 230A gradually reduces average power Pa.

Average power deriver 230A outputs average power Pa, which changes over time, to first influence degree deriver 240. Note that when the frame rate, which is the rate at which the image data updates, influences average power Pa, average power deriver 230A may derive average power Pa based on the frame rate signal included in the video signal.

First influence degree deriver 240 derives first influence degree i1, which changes over time, based on average power Pa, which changes over time, and outputs it to first increased temperature deriver 250. First increased temperature deriver 250 derives increased temperature Tr of panel surface 12a, which changes over time, based on first influence degree i1, which changes over time, and outputs it to surface temperature estimator 260. Surface temperature estimator 260 estimates the temperature of panel surface 12a based on the time-varying increased temperature Tr.

According to display device 1 of Variation 1, it is possible to estimate the temperature of panel surface 12a in accordance with changes in images shown on display panel 12.

Variation 2 of Embodiment

Display device 1 according to Variation 2 of the embodiment will be described with reference to FIG. 10 and FIG. 15. In the present variation, an example will be given in which the temperature of panel surface 12a is estimated when the temperature on display panel 12 varies locally.

Display device 1 according to Variation 2 includes display panel 12, gate driver 13, data driver 15, controller 16, and power supply 17. Controller 16 includes therein temperature estimating device 200B that estimates the temperature of the surface of display panel 12. Display device 1 according to Variation 2 also includes temperature detector 110.

Figure 10:
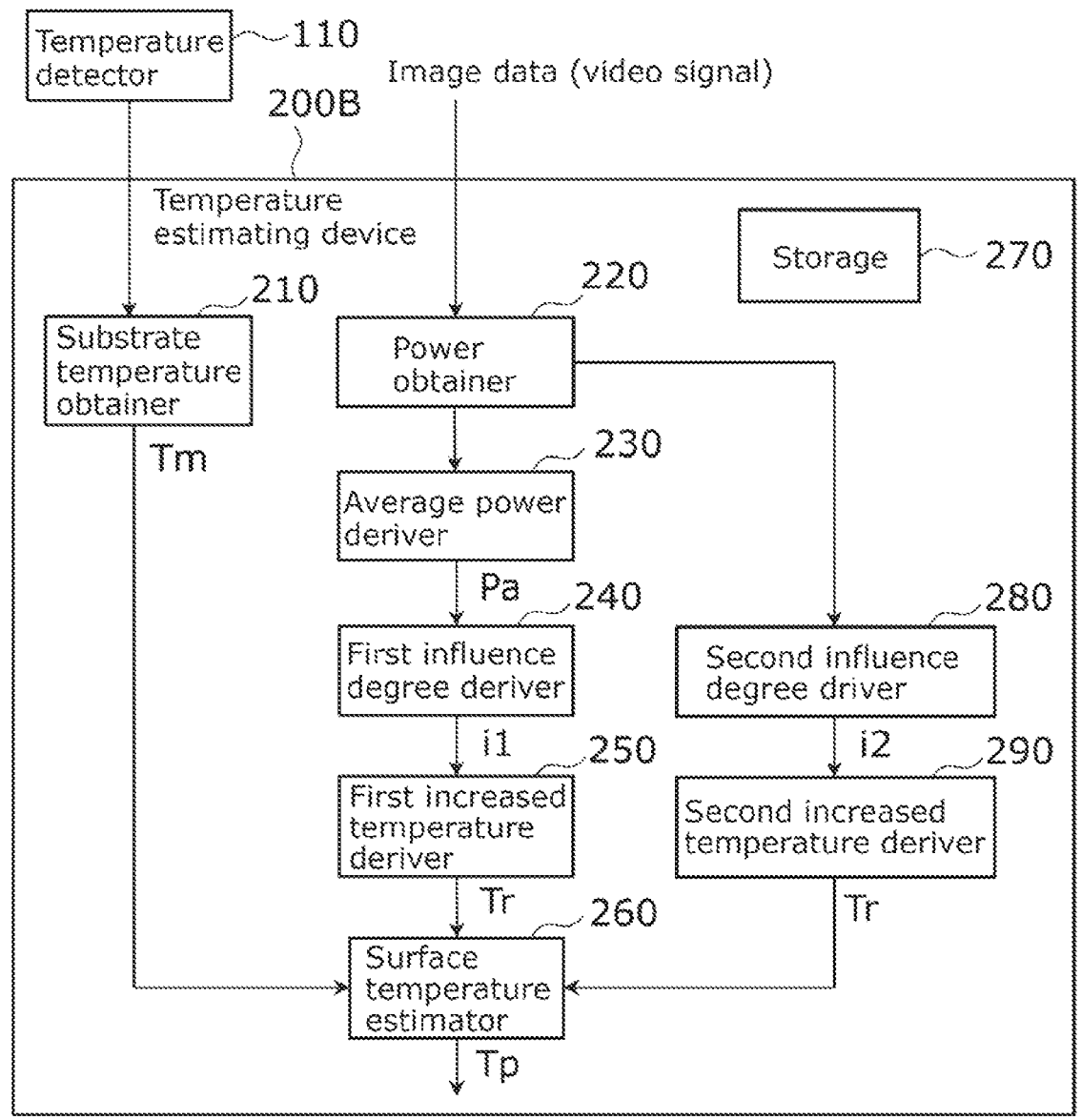
FIG. 10 is a block diagram of a temperature estimating device included in the display device according to Variation 2 of the embodiment.

FIG. 10 is a block diagram of temperature estimating device 200B included in display device 1.

As illustrated in FIG. 10, temperature estimating device 200B includes substrate temperature obtainer 210, power obtainer 220, average power deriver 230, first influence degree deriver 240, first increased temperature deriver 250, and surface temperature estimator 260. Temperature estimating device 200B also includes storage 270 that stores various information. Temperature estimating device 200B according to Variation 2 further includes second influence degree deriver 280 and second increased temperature deriver 290.

Substrate temperature obtainer 210, power obtainer 220, average power deriver 230, first influence degree deriver 240, and first increased temperature deriver 250 are the same as in the embodiment.

In cases in which the temperature on display panel 12 varies locally, temperature estimating device 200B according to Variation 2 obtains information related to power for selected region D1 among segmented regions D and information related to power for peripheral regions D2 among segmented regions D, and estimates the temperature of display panel 12 based on this information related to power. Note that temperature varying locally means heat is not able to easily transfer between adjacent segmented regions D due to the presence of, for example, walls partitioning display panel 12 or a hood covering display panel 12.

Figure 11:
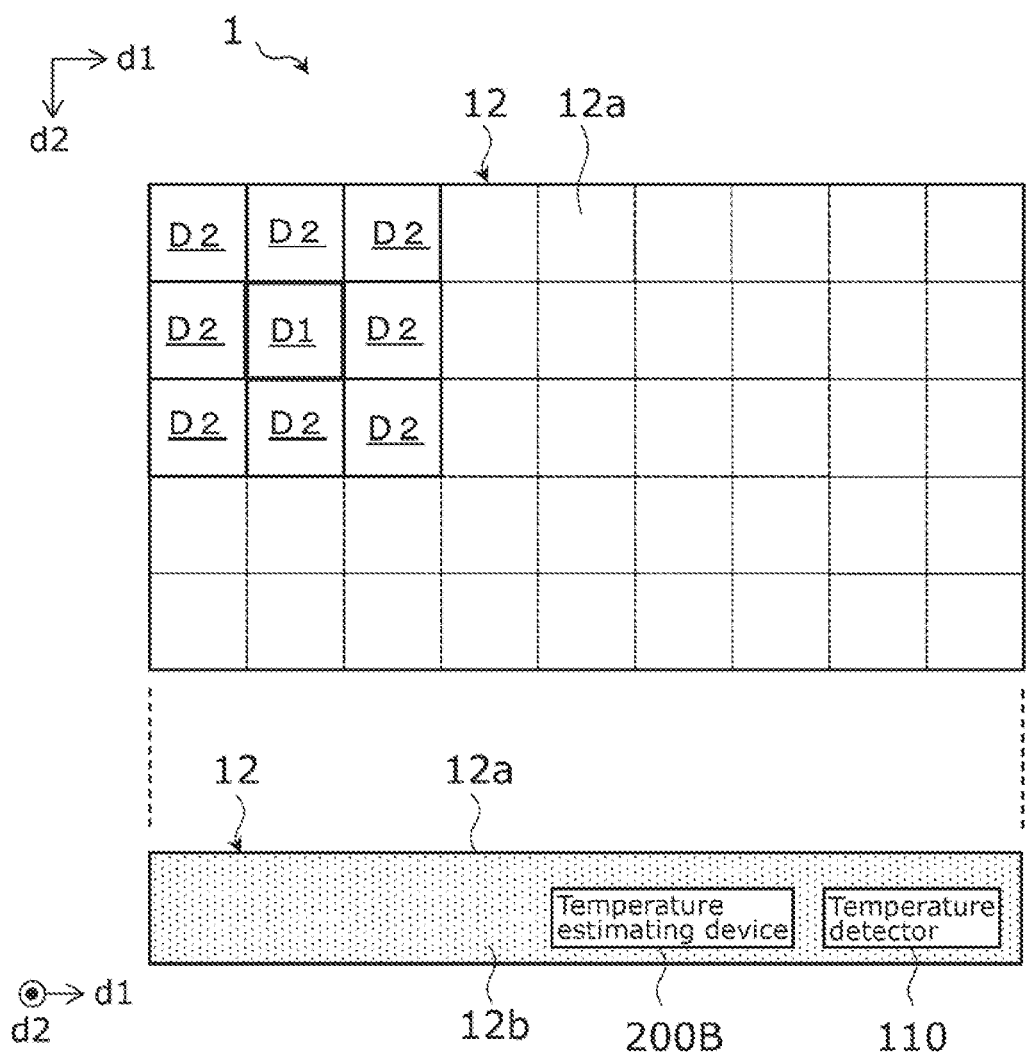
FIG. 11 illustrates one example of a selected region and peripheral regions in the display panel.

FIG. 11 illustrates one example of selected region D1 and peripheral regions D2 in display panel 12.

Selected region D1 is a predetermined segmented region selected from the plurality of segmented regions D. Selected region D1 is applied to areas where temperature varies locally. Peripheral regions D2 are segmented regions D in the surrounding area of selected region D1. In the example illustrated in FIG. 11, there is one selected region D1 and eight peripheral regions D2. Selected region D1 is surrounded by a plurality of peripheral regions D2; selected region D1 is located at the center of the plurality of peripheral regions D2. Selected region D1 and peripheral regions D2 have the same quadrangular shape, and each peripheral region D2 contacts one side or vertex of selected region D1. Two adjacent peripheral regions D2 contact one another at two sides thereof.

Power obtainer 220 illustrated in FIG. 10 obtains the amount of power used by each of selected region D1 and peripheral regions D2 based on the image data displayed on display panel 12. The power used by selected region D1 and peripheral regions D2 is determined by the current and voltage supplied to the corresponding pixel circuits 10 based on the video signal, which is image data. Information related to power used by selected region D1 and peripheral regions D2 obtained by power obtainer 220 is output to second influence degree deriver 280.

Second influence degree deriver 280 derives the degree of influence that power used by selected region D1 and power used by peripheral regions D2 have on a temperature increase of selected region D1, based on the power used by selected region D1 and the power used by peripheral regions D2. Hereinafter, the degree of influence that power used by selected region D1 and power used by peripheral regions D2 has on a temperature increase of selected region D1 will be referred to as second influence degree i2. The function indicating the relationship between (i) power used by selected region D1 and power used by peripheral regions D2 and (ii) second influence degree i2 will hereinafter be referred to as second power-influence function f2.

Figure 12:
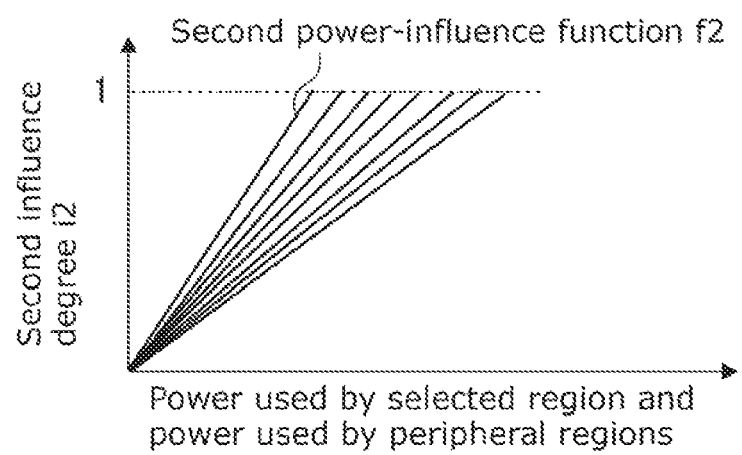
FIG. 12 schematically illustrates a second power-influence function.

FIG. 12 schematically illustrates second power-influence function f2.

For example, second power-influence function f2 illustrated in FIG. 12 can be calculated as follows. First, predetermined image data is shown on selected region D1 and all peripheral regions D2 while a thermocouple is contacting selected region D1, and the temperature of selected region D1 is measured. In order to prevent other segmented regions D from influencing selected region D1 and peripheral regions D2, no image is shown on segmented regions D outward of peripheral regions D2.

The predetermined image data displayed in selected region D1 and peripheral regions D2 is a plurality of types of emission data with different emission regions. In this example, the number and locations of peripheral regions D2 caused to display the image data are varied. For example, the number of peripheral regions D2 caused to display the image data is selected from a range of 1 to 8, inclusive. The locations of peripheral regions D2 caused to display the image data are symmetrical or asymmetrical, every other region, every two regions, every three regions, etc. This yields second power-influence function f2 in which the relationship between (i) power used by selected region D1 and power used by peripheral regions D2 and (ii) second influence degree i2 is normalized. In this example, since the number of peripheral regions D2 caused to display the image data is varied, second power-influence function f2 includes a plurality of functions. Second power-influence function f2 may be a function obtained by multivariate analysis. Second power-influence function f2 obtained in this way is stored in storage 270.

Second influence degree deriver 280 illustrated in FIG. 10 derives second influence degree i2 by substituting the power used by selected region D1 and the power used by peripheral regions D2 into second power-influence function f2. When a plurality of second power-influence functions f2 are stored in storage 270, the second power-influence function f2 corresponding to the number of peripheral regions D2 caused to display the image data is selected. Second influence degree deriver 280 may derive second influence degree i2 by data interpolation when there is no influence degree value that directly corresponds to the power used by selected region D1 and the power used by peripheral regions D2. The information related to second influence degree i2 obtained by second influence degree deriver 280 is output to second increased temperature deriver 290.

Second increased temperature deriver 290 derives increased temperature Tr of selected region D1 based on the information related to second influence degree i2 output from second influence degree deriver 280.

Figure 13:
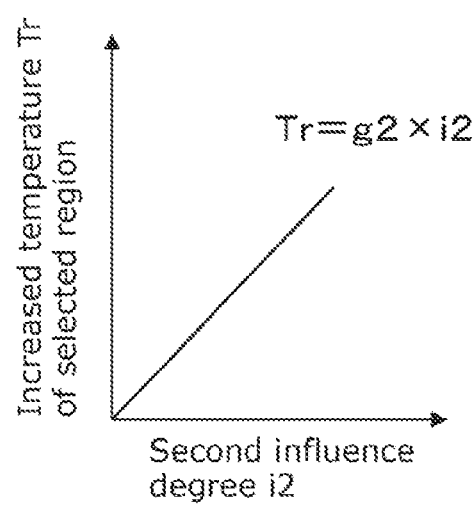
FIG. 13 schematically illustrates the relationship between the second influence degree and the increased temperature of the selected region.

FIG. 13 schematically illustrates the relationship between second influence degree i2 and increased temperature Tr of selected region D1.

Second increased temperature deriver 290 multiplies second influence degree i2 by a predetermined second coefficient g2 to derive increased temperature Tr of selected region D1. For example, increased temperature Tr of selected region D1 is calculated using the equation "increased temperature Tr of selected region D1=second coefficient g2×second influence degree i2 . . . (Expression 2)".

Coefficient g2 is a value for applying normalized data to actual data. Coefficient g2 may be a value that changes depending on the season or region in which display device 1 is used. Coefficient g2 is set such that the increased temperature is the maximum temperature when second influence degree i2 is 1. For example, when the maximum increased temperature is 20° C. at 100% emission rate of the pixels corresponding to selected region D1 and all peripheral regions D2, coefficient g2 is set to 20 so that second influence degree i2 equals 1. Coefficient g2 determined in this manner is stored in storage 270. Second increased temperature deriver 290 derives increased temperature Tr of selected region D1 using the predetermined coefficient g2.

Although the above describes an example in which there is one selected region D1, two or more selected regions D1 may be used according to the size of the region characterized by a locally different temperature. Here, an example will be given in which a plurality of selected regions D1 are contiguous along the surface of display panel 12.

Second increased temperature deriver 290 derives an increased temperature for selected regions D1 by interpolation between pixels included in selected regions D1 based on increased temperatures Tr derived per selected region D1.

Figure 14:
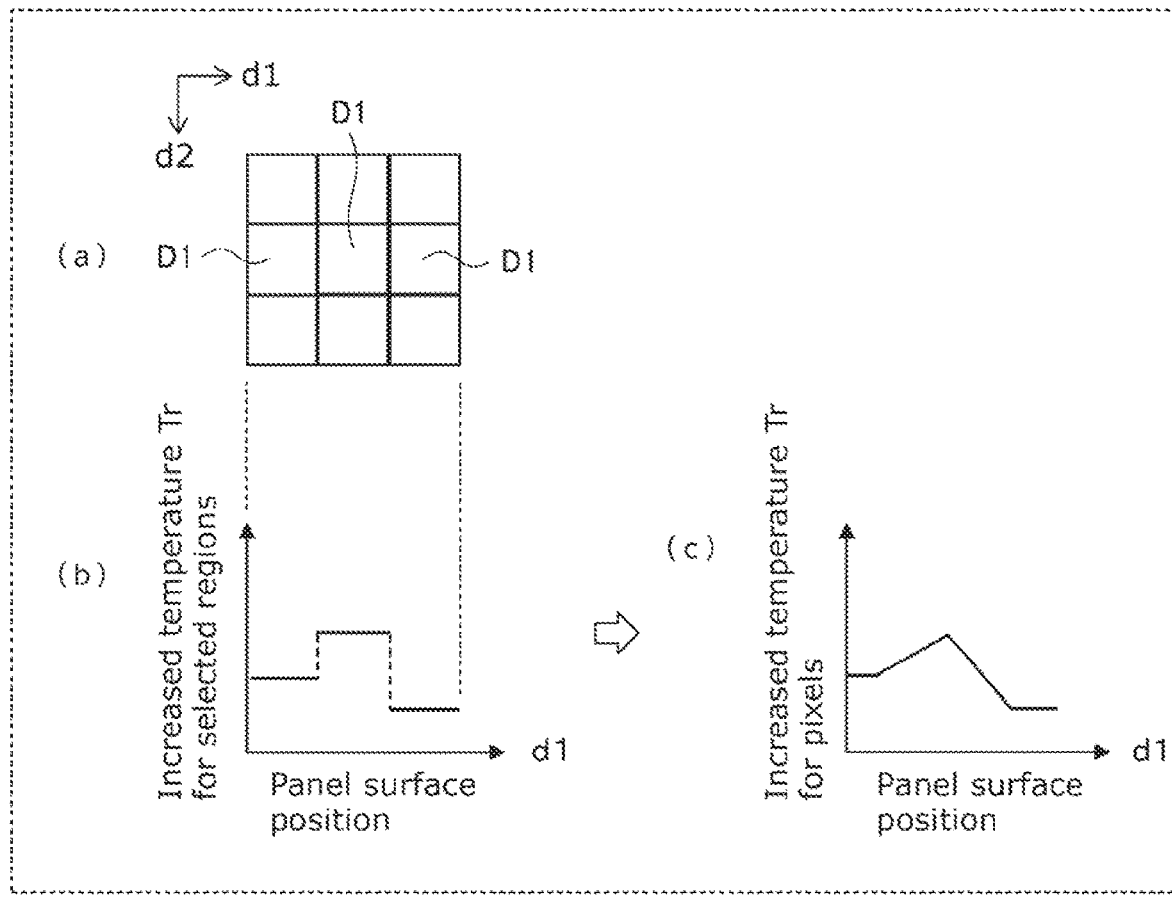
FIG. 14 illustrates one example of the increased temperature for selected regions and the increased temperature for pixels.

FIG. 14 illustrates one example of increased temperature Tr for selected regions D1 and increased temperature Tr for pixels.

In FIG. 14, (a) illustrates a plan view of nine selected regions D1, and (b) illustrates increased temperature Tr for three selected regions D1 that are contiguous in first direction d1 in (a). In FIG. 14, increased temperature Tr for the three selected regions D1 abruptly increases and decreases from one selected region D1 to another. In FIG. 14, (c) illustrates an example in which increased temperature Tr for the three selected regions D1 is expressed as increased temperature Tr for the pixels. In FIG. 14, increased temperature Tr for the three selected regions D1 gradually increases and decreases from one selected region D1 to another.

Second increased temperature deriver 290 converts increased temperature Tr for the three selected regions D1 illustrated in (b) in FIG. 14 into increased temperature Tr for the pixels by interpolation between the pixels included in the three selected regions D1. This conversion smoothens the changes in increased temperature Tr for selected regions D1, as illustrated (c) in FIG. 14. Information related to the converted increased temperature Tr for selected regions D1 is output to surface temperature estimator 260.

Surface temperature estimator 260 illustrated in FIG. 10 estimates the temperature of panel surface 12a based on substrate temperature Tm obtained by substrate temperature obtainer 210, the average increased temperature Tr of panel surface 12a, and increased temperature Tr for selected regions D1.

Figure 15:
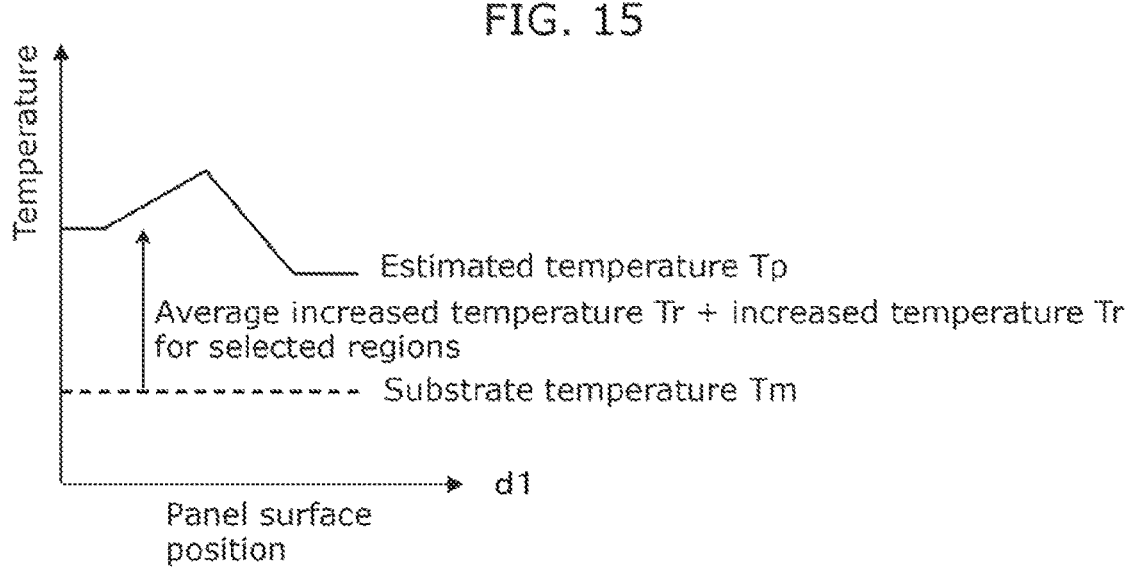
FIG. 15 illustrates the substrate temperature, the increased temperature of the panel surface, the temperature increase for the selected regions, and the estimated temperature of the panel surface.

FIG. 15 illustrates substrate temperature Tm, increased temperature Tr of panel surface 12a, increased temperature Tr for selected regions D1, and estimated temperature Tp of panel surface 12a.

As illustrated in FIG. 15, surface temperature estimator 260 derives estimated temperature Tp, which is the temperature of panel surface 12a, by adding the average increased temperature Tr of panel surface 12a and increased temperature Tr for selected regions D1 to substrate temperature Tm. Since increased temperature Tr of selected regions D1 is a gradual temperature distribution obtained by interpolation between pixels, estimated temperature Tp is also a gradual temperature distribution similar to the actual temperature of panel surface 12a. Estimated temperature Tp derived by temperature estimating device 200B is processed in controller 16 (see FIG. 1). Controller 16 knows the deterioration amount of display panel 12 based on estimated temperature Tp, and controls the driving of display panel 12 based on the deterioration amount.

With display device 1 according to Variation 2, the temperature of panel surface 12a is estimated by adding increased temperature Tr for selected regions D1 to substrate temperature Tm and the average increased temperature Tr of panel surface 12a. This makes it possible to appropriately estimate the temperature of the surface of display panel 12 in cases in which the temperature on display panel 12 varies locally.

Variation 3 of Embodiment

Display device 1 according to Variation 3 of the embodiment will be described with reference to FIG. 16. In the present variation, an example will be given in which the temperature of panel surface 12a is estimated when heat is very unlikely to diffuse on display panel 12. In this variation, the temperature of panel surface 12a is estimated using increased temperature Tr of selected region D1, without using the average increased temperature Tr of panel surface 12a described in the embodiment.

Display device 1 according to Variation 3 includes display panel 12, gate driver 13, data driver 15, controller 16, and power supply 17. Controller 16 includes therein temperature estimating device 200C that estimates the temperature of the surface of display panel 12. Display device 1 according to Variation 3 also includes temperature detector 110.

Figure 16:
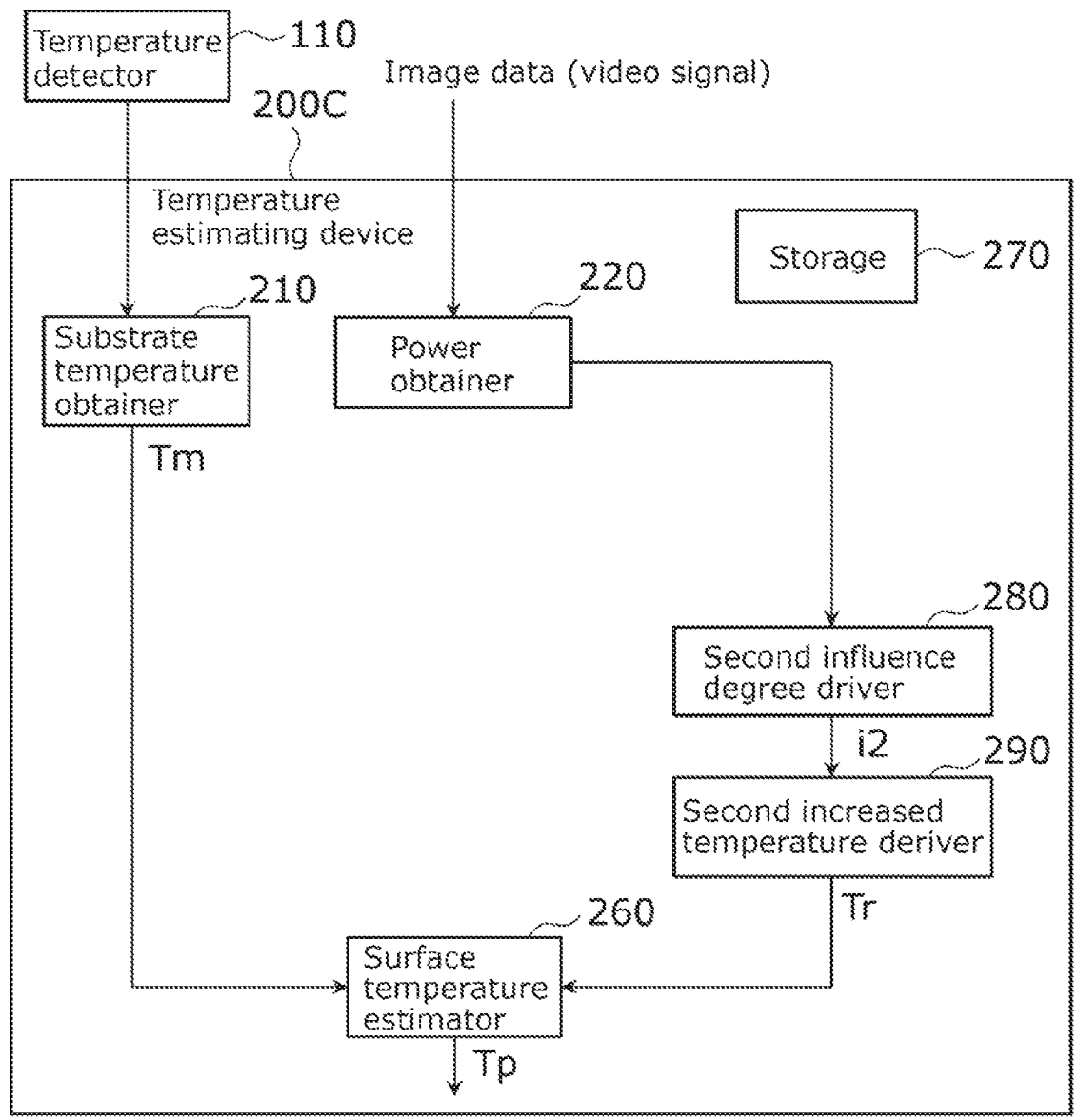
FIG. 16 is a block diagram of a temperature estimating device included in the display device according to Variation 3 of the embodiment.

FIG. 16 is a block diagram of temperature estimating device 200C included in display device 1.

As illustrated in FIG. 16, temperature estimating device 200C includes substrate temperature obtainer 210, power obtainer 220, second influence degree deriver 280, second increased temperature deriver 290, and surface temperature estimator 260. Temperature estimating device 200B also includes storage 270 that stores various information.

Substrate temperature obtainer 210, power obtainer 220, second influence degree deriver 280, and second increased temperature deriver 290 are the same as in Variation 2.

In cases in which the temperature on display panel 12 varies locally, temperature estimating device 200C according to Variation 3 also obtains information related to power for selected region D1 among segmented regions D and information related to power for peripheral regions D2 among segmented regions D, and estimates the temperature of display panel 12 based on this information related to power.

Power obtainer 220 obtains the amount of power used by each of selected region D1 and peripheral regions D2 based on the image data displayed on display panel 12.

Second influence degree deriver 280 derives the degree of influence (second influence degree i2) that power used by selected region D1 and power used by peripheral regions D2 have on a temperature increase of selected region D1, based on the power used by selected region D1 and the power used by peripheral regions D2.

Second increased temperature deriver 290 multiplies second influence degree i2 by a predetermined second coefficient g2 to derive increased temperature Tr of selected region D1. Second increased temperature deriver 290 derives the increased temperature for selected regions D1 by interpolation between pixels included in selected regions D1 based on increased temperatures Tr derived per selected region D1.

Surface temperature estimator 260 estimates the temperature of panel surface 12a based on substrate temperature Tm obtained by substrate temperature obtainer 210 and increased temperature Tr of selected region D1.

With display device 1 according to Variation 3, the temperature of panel surface 12a is estimated by adding increased temperature Tr of selected region D1 to substrate temperature Tm. This makes it possible to appropriately estimate the temperature of the surface of display panel 12 in cases in which the temperature on display panel 12 varies locally.

CONCLUSION

Display device 1 according to the present embodiment includes: substrate temperature obtainer 210 that obtains substrate temperature Tm of substrate 12b of display panel 12; power obtainer 220 that obtains an amount of power used by a plurality of segmented regions D of display panel 12, based on image data displayed on display panel 12; increased temperature deriver 250 (or 290) that derives increased temperature Tr of panel surface 12a of display panel 12 based on the amount of power used by the plurality of segmented regions D; and surface temperature estimator 260 that estimates a temperature of panel surface 12a based on substrate temperature Tm and increased temperature Tr.

According to this display device 1, increased temperature Tr of panel surface 12a is derived based on power used by the plurality of segmented regions D of display panel 12. This makes it possible to appropriately estimate the temperature of the surface of display panel 12 based on substrate temperature Tm and increased temperature Tr.

Display device 1 may further include: average power deriver 230 that derives average power Pa used by all of the plurality of segmented regions D based on an amount of power used by each of the plurality of segmented regions D; and first influence degree deriver 240 that derives, based on average power Pa, first influence degree i1 indicating a degree of influence that average power Pa has on a temperature increase of panel surface 12a. The increased temperature deriver is first increased temperature deriver 250 that derives an average increased temperature Tr of panel surface 12a based on first influence degree i1. Surface temperature estimator 260 may estimate the temperature of panel surface 12a by summing substrate temperature Tm and the average increased temperature Tr of panel surface 12a.

In this way, it is possible to appropriately derive the average increased temperature Tr of panel surface 12a by deriving first influence degree i1 based on average power Pa and deriving the average increased temperature Tr based on first influence degree i1. This makes it possible to appropriately estimate the temperature of the surface of display panel 12 based on substrate temperature Tm and the average increased temperature Tr.

Display device 1 may further include: storage 270 that stores first power-influence function f1 indicating a relationship between average power Pa and first influence degree i1. First influence degree deriver 240 may derive first influence degree i1 by substituting average power Pa derived by average power deriver 230 into first power-influence function f1.

In this way, it is possible to appropriately derive first influence degree i1 by substituting average power Pa derived by average power deriver 230 into first power-influence function f1. This makes it possible to appropriately derive the average increased temperature Tr of panel surface 12a based on first influence degree i1, and appropriately estimate the temperature of the surface of display panel 12.

First increased temperature deriver 250 may derive the average increased temperature Tr of panel surface 12a by multiplying first influence degree i1 by a predetermined first coefficient g1.

In this way, it is possible to appropriately derive the average increased temperature Tr of panel surface 12a by multiplying first influence degree i1 by first coefficient g1. This makes it possible to appropriately estimate the temperature of the surface of display panel 12.

When a change in average power Pa during predetermined period t1 is greater than a predetermined threshold, average power deriver 230 may derive average power Pa so as to change over period t2 longer than predetermined period t1.

With this, it is possible to derive first influence degree i1, which changes over time, based on average power Pa, which changes over time. Accordingly, even in cases in which, for example, the image shown on display panel 12 abruptly changes, the average increased temperature Tr of panel surface 12a can be appropriately derived based on first influence degree i1, which changes over time. This makes it possible to appropriately estimate the temperature of the surface of display panel 12 based on substrate temperature Tm and the average increased temperature Tr.

Surface temperature estimator 260 may estimate the temperature of the entirety of panel surface 12a.

This makes it possible to appropriately estimate the temperature of the entire surface of display panel 12.

Display device 1 may further include: second influence degree deriver 280 that derives second influence degree i2 indicating a degree of influence that power used by selected region D1 and power used by peripheral regions D2 have on a temperature increase of selected region D1, based on the power used by selected region D1 and the power used by peripheral regions D2, selected region D1 being a predetermined segmented region selected from the plurality of segmented regions D, peripheral regions D2 being segmented regions, among the plurality of segmented regions D, in a surrounding area of selected region D1; and second increased temperature deriver 290 that derives increased temperature Tr of selected region D1 based on second influence degree i2. Surface temperature estimator 260 may estimate the temperature of panel surface 12a by summing substrate temperature Tm, the average increased temperature Tr of panel surface 12a, and increased temperature Tr of selected region D1.

In this way, it is possible to appropriate derive increased temperature Tr of selected region D1 by deriving second influence degree i2 based on the power used by selected region D1 and the power used by peripheral regions D2, and deriving increased temperature Tr of selected region D1 based on second influence degree i2. This makes it possible to appropriately estimate the temperature of the surface of display panel 12 based on substrate temperature Tm, the average increased temperature Tr of panel surface 12a, and increased temperature Tr of selected region D1.

Display device 1 may further include storage 270 that stores second power-influence function f2 indicating a relationship between (i) the power used by selected region D1 and the power used by peripheral regions D2 and (ii) second influence degree i2. Second influence degree deriver 280 may derive second influence degree i2 by substituting the power used by selected region D1 and the power used by peripheral regions D2 into second power-influence function f2.

This makes it possible to appropriately derive second influence degree i2 by substituting the power used by selected region D1 and the power used by peripheral regions D2 into second power-influence function f2. This makes it possible to appropriately derive increased temperature Tr of selected region D1 based on second influence degree i2, and appropriately estimate the temperature of the surface of display panel 12.

Second increased temperature deriver 290 may derive increased temperature Tr of selected region D1 by multiplying second influence degree i2 by a predetermined second coefficient g2.

In this way, it is possible to appropriately derive increased temperature Tr of selected region D1 by multiplying second influence degree i2 by second coefficient g2. This makes it possible to appropriately estimate the temperature of the surface of display panel 12.

Second increased temperature deriver 290 may derive increased temperature Tr for selected regions D1 by interpolation between pixels included in selected regions D1 based on increased temperatures Tr derived per selected region D1.

In this way, it is possible to inhibit abrupt changes in increased temperature Tr from one selected region D1 to another by interpolation between pixels included in selected regions D1 based on increased temperature Tr for selected regions D1. This makes it possible to appropriately derive increased temperature Tr of selected regions D1, and appropriately estimate the temperature of the surface of display panel 12.

Surface temperature estimator 260 may estimate a local temperature of panel surface 12a.

This makes it possible to appropriately estimate the temperature of the surface of display panel 12.

Display device 1 may further include: influence degree deriver 280 that derives influence degree i2 that power used by selected region D1 and power used by peripheral regions D2 have on a temperature increase of selected region D1, based on the power used by selected region D1 and the power used by peripheral regions D2, selected region D1 being a predetermined segmented region selected from the plurality of segmented regions D, peripheral regions D2 being segmented regions, among the plurality of segmented regions D, in a surrounding area of selected region D1. Increased temperature deriver 290 may derive increased temperature Tr of selected region D1 based on degree of influence i2. Surface temperature estimator 260 may estimate the temperature of panel surface 12a by adding increased temperature Tr of selected region D1 to substrate temperature Tm.

In this way, it is possible to appropriate derive increased temperature Tr of selected region D1 by deriving the above-described influence degree i2 based on the power used by selected region D1 and the power used by peripheral regions D2, and deriving increased temperature Tr of selected region D1 based on influence degree i2. This makes it possible to appropriately estimate the temperature of the surface of display panel 12 based on substrate temperature Tm and increased temperature Tr of selected region D1.

Other Embodiments

Note that the present disclosure is not limited to the configurations described in the above embodiment and variations thereof; modifications may be made as appropriate.

Although substrate temperature Tm described in the embodiment is exemplified as a temperature detected by a temperature sensor, substrate temperature Tm is not limited to this example. For example, the temperature detected by the temperature sensor may be corrected according to a heat characteristic of display device 1, and the corrected temperature may be used as substrate temperature Tm. Examples of correction according to a heat characteristic of display device 1 include correction according to heat generated by the power supply IC in substrate 12b and correction according to the temperature inside the housing of display device 1.

In Variation 2, an example is given in which increased temperature Tr of selected region D1 is further added to the average increased temperature Tr, but either first coefficient g1 or second coefficient g2 may be modified to avoid adding two increased temperatures to the same segmented region D on display panel 12. For example, in Variation 2, first coefficient g1 used by first increased temperature deriver 250 may be changed to a smaller value than first coefficient g1 used in the embodiment.

In Variation 2, an example is given in which interpolation between pixels included in three selected regions D1 is performed based on increased temperature Tr for the three selected regions D1, but this interpolation process does not necessarily need to be performed. For example, when the surface area of selected region D1 is sufficiently small, increased temperature Tr of selected region D1 can be used as-is without performing the pixel interpolation process to estimate the temperature of the surface of display panel 12.

For example, the light-emitting element is not limited to an organic EL element, and may be some other light-emitting element such as an LED.

For example, gate driver 13 may be arranged at one short side of display panel 12 as illustrated in FIG. 1, but is not limited to this example, and may be arranged at the two opposing short sides of display panel 12. Moreover, data driver 15 may be arranged at one long side of display panel 12 as illustrated in FIG. 1, but is not limited to this example, and may be arranged at the two opposing long sides of display panel 12.

Various modifications to the embodiments as well as embodiments resulting from arbitrary combinations of elements and functions of different embodiments that may be conceived by those skilled in the art are included in the scope of in the present disclosure as long as they do not depart from the novel teachings of the present disclosure. For example, examples of the display device including the temperature estimating device according to the present disclosure that are included in the scope of the present disclosure include flat screen television systems, gaming devices that include a display panel, and PC monitor systems.

INDUSTRIAL APPLICABILITY

The present disclosure is widely applicable as a display device in a variety of video display devices such as mobile information terminals, personal computers, television receivers, etc.

The invention claimed is:
1. A display device, comprising:
a substrate temperature obtainer that obtains a substrate temperature of a substrate of a display panel;
a power obtainer that obtains an amount of power used by a plurality of segmented regions of the display panel, based on image data displayed on the display panel;
an increased temperature deriver that derives an increased temperature of a panel surface of the display panel based on the amount of power used by the plurality of segmented regions;
a surface temperature estimator that estimates a temperature of the panel surface based on the substrate temperature and the increased temperature; and
an average power deriver that derives an average power used by the plurality of segmented regions based on the amount of power used by each of the plurality of segmented regions,
wherein, when a change in the average power during a predetermined period is greater than a predetermined threshold, the average power deriver derives the average power so as to change over a period longer than the predetermined period.

2. The display device according to claim 1, further comprising:
a first influence degree deriver that derives, based on the average power, a first influence degree indicating a degree of influence that the average power has on a temperature increase of the panel surface, wherein
the increased temperature deriver is a first increased temperature deriver that derives an average increased temperature of the panel surface based on the first influence degree, and
the surface temperature estimator estimates the temperature of the panel surface by summing the substrate temperature and the average increased temperature of the panel surface.

3. The display device according to claim 2, further comprising:
storage that stores a first power-influence function indicating a relationship between the average power and the first influence degree, wherein
the first influence degree deriver derives the first influence degree by substituting the average power derived by the average power deriver into the first power-influence function.

4. The display device according to claim 3, wherein the first increased temperature deriver derives the average increased temperature of the panel surface by multiplying the first influence degree by a predetermined first coefficient.

5. The display device according to claim 2, further comprising:
a second influence degree deriver that derives a second influence degree indicating a degree of influence that power used by a selected region and power used by peripheral regions have on a temperature increase of the selected region, based on the power used by the selected region and the power used by the peripheral regions, the selected region being a predetermined segmented region selected from the plurality of segmented regions, the peripheral regions being segmented regions, among the plurality of segmented regions, in a surrounding area of the selected region; and
a second increased temperature deriver that derives an increased temperature of the selected region based on the second influence degree, wherein
the surface temperature estimator estimates the temperature of the panel surface by summing the substrate temperature, the average increased temperature of the panel surface, and the increased temperature of the selected region.

6. The display device according to claim 5, further comprising:

storage that stores a second power-influence function indicating a relationship between (i) the power used by the selected region and the power used by the peripheral regions and (ii) the second influence degree, wherein the second influence degree deriver derives the second influence degree by substituting the power used by the selected region and the power used by the peripheral regions into the second power-influence function.

7. The display device according to claim 5, wherein the second increased temperature deriver derives the increased temperature of the selected region by multiplying the second influence degree by a predetermined second coefficient.

8. The display device according to claim 5, wherein the selected region comprises a plurality of selected regions, and the second increased temperature deriver derives an increased temperature of the plurality of selected regions by interpolation between pixels included in the plurality of selected regions based on increased temperatures derived per selected region.

9. The display device according to claim 5, wherein the surface temperature estimator estimates a local temperature of the panel surface.

10. The display device according to claim 1, wherein the surface temperature estimator estimates the temperature of an entirety of the panel surface.

11. The display device according to claim 1, further comprising:

an influence degree deriver that derives a degree of influence that power used by a selected region and power used by peripheral regions have on a temperature increase of the selected region, based on the power used by the selected region and the power used by the peripheral regions, the selected region being a predetermined segmented region selected from the plurality of segmented regions, the peripheral regions being segmented regions, among the plurality of segmented regions, in a surrounding area of the selected region, wherein the increased temperature deriver derives an increased temperature of the selected region based on the degree of influence, and the surface temperature estimator estimates the temperature of the panel surface by adding the increased temperature of the selected region to the substrate temperature.

12. A display device, comprising:

a storage including a program, wherein, when executed, the program causes the display device to perform operations, the operations including:
obtaining a substrate temperature of a substrate of a display panel;
obtaining an amount of power used by a plurality of segmented regions of the display panel, based on image data displayed on the display panel;
deriving an increased temperature of a panel surface of the display panel based on the amount of power used by the plurality of segmented regions;
estimating a temperature of the panel surface based on the substrate temperature and the increased temperature; and
deriving an average power used by the plurality of segmented regions based on the amount of power used by each of the plurality of segmented regions, wherein, when a change in the average power during a predetermined period is greater than a predetermined threshold, the display device derives the average power so as to change over a period longer than the predetermined period.

* * * * *